United States Patent
Lutz

[19]

[11] Patent Number: 6,095,012
[45] Date of Patent: Aug. 1, 2000

[54] STEERING COLUMN FOR A MOTOR VEHICLE

[75] Inventor: Christian Lutz, Nüziders, Austria

[73] Assignee: Etablissement Supervis, Vaduz, Liechtenstein

[21] Appl. No.: 08/824,376

[22] Filed: Mar. 26, 1997

[30] Foreign Application Priority Data

Apr. 18, 1996 [AT] Austria ........................... 702/96

[51] Int. Cl.[7] ........................................ B62D 1/18
[52] U.S. Cl. .............................. 74/493; 280/775
[58] Field of Search ................. 74/493; 280/775

[56] References Cited

U.S. PATENT DOCUMENTS

| | | | |
|---|---|---|---|
| 4,732,050 | 3/1988 | Vollmer ........................... | 74/493 |
| 5,117,707 | 6/1992 | Kinoshita et al. .................. | 74/493 |
| 5,199,319 | 4/1993 | Fujiu ............................. | 74/493 |
| 5,481,938 | 1/1996 | Stuedemann et al. ................ | 74/493 |
| 5,606,891 | 3/1997 | Tisell et al. .................... | 74/493 |
| 5,722,299 | 3/1998 | Yamamoto et al. ................. | 74/493 |

FOREIGN PATENT DOCUMENTS

| | | |
|---|---|---|
| 0600700 | 6/1994 | European Pat. Off. . |
| 0671308 | 9/1995 | European Pat. Off. . |
| 4016163 | 11/1991 | Germany . |
| 4400306 | 7/1994 | Germany . |
| 2092966 | 8/1982 | United Kingdom . |

*Primary Examiner*—Charles A. Marmor
*Assistant Examiner*—David Fenstermacher
*Attorney, Agent, or Firm*—Anderson, Kill & Olick, P.C.

[57] ABSTRACT

A steering column for a motor vehicle includes a support element fixedly attachable to a motor vehicle body, a steering column jacket located between the two legs of the support element, a coupling bolt arranged transverse to a steering shaft axis and extending through the steering column jacket and respective longitudinal slots provided in the two legs of the support element, at least two lamellas provided on an outer side of at least one leg of the support element and on an outer side of the steering column jacket, respectively, with the lamellas mutually overlapping each other and each having an opening located in their common overlapping region, with the opening defining together a through-opening for the coupling bolt, and with a pressure plate located at one end of the coupling bolt and an adjustable preloading member located at another end of the coupling bolt and cooperating with the pressure plate for pressing the lamellas together.

14 Claims, 3 Drawing Sheets

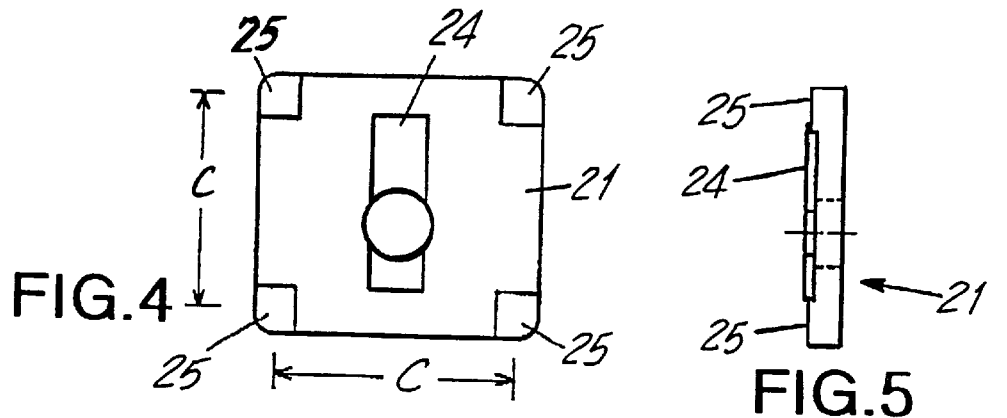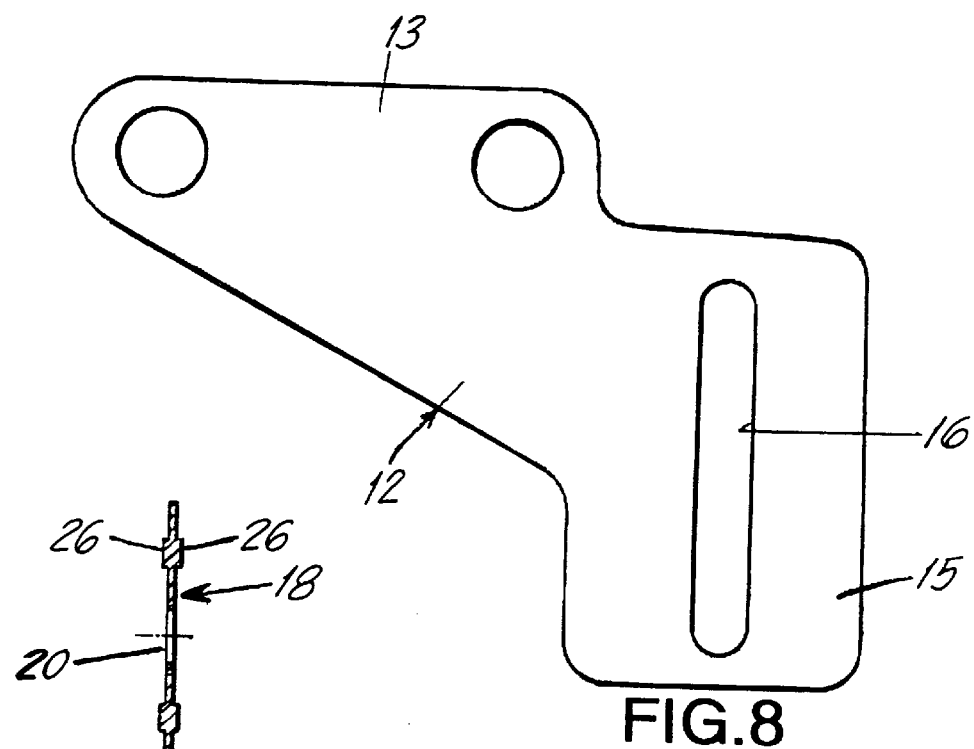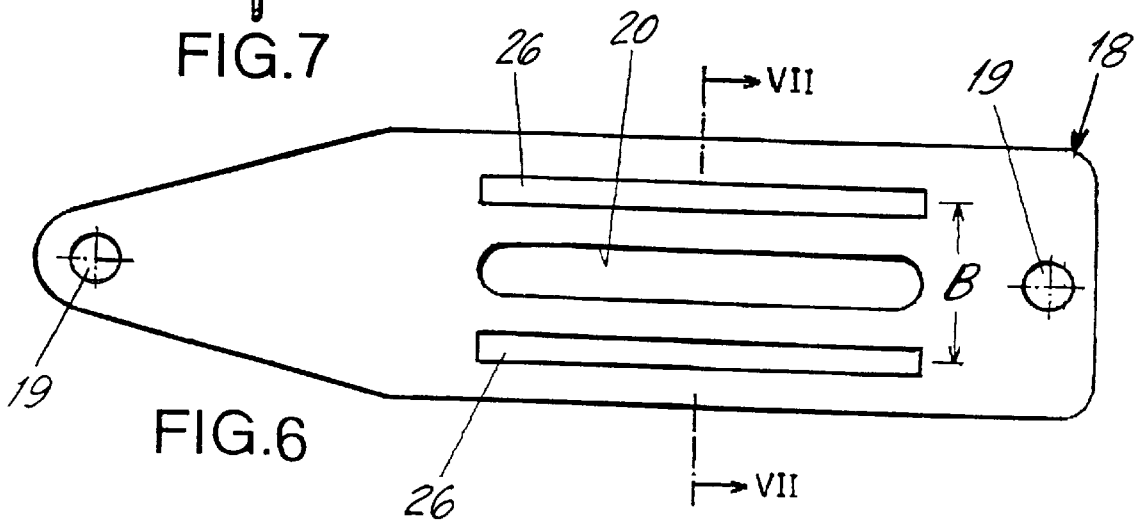

STEERING COLUMN FOR A MOTOR VEHICLE

BACKGROUND OF THE INVENTION

1. Field of the Invention

The present invention relates to a steering column for a motor vehicle including a support element fixedly attachable to the vehicle body, and a steering column jacket for receiving the steering shaft and located between the legs of the support element.

2. Description of the Prior Art

In contemporary motor vehicles, the steering columns are to be formed and arranged so that the steering wheel, provided at one column end, is adjustable either in height or in a direction toward the driver, or has both adjustment possibilities. These adjustments define a displaced or pivoted position of the steering column components, for reliable and lasting fixing of which additional clamping and preloading elements need be provided. On the other hand, these clamping and preloading elements need be easily actuatable in order to bring the steering wheel, when necessary, in the desired position and to reliably retain it there. Examples of such elements are described in German publications DE 44 00 306A1 and DE 40 16 163A1.

In particular, a construction according to European publication EPO 0 671 308A should be noted. In this construction, a fork-shaped housing of the steering column is located between two legs of a support element. On fork ends, there are provided elongate slots through which a bolt extends having its both ends secured to the legs of the support element. On the inner side of the fork on both its side, there are provided spring washers through which the bolt extends. Further, between the two spring washers, free axially displaceable cylindrical pressure elements are provided between which there is provided a preloading member rotatable about the bolt axis. The preloading member presses the cylindrical pressure elements outwardly against the spring washers. This construction is not very useful as it involves a very expensive assembly operation which is required for positioning components necessary for preloading between the fork ends of the steering column housing.

Accordingly, an object of the present invention is to provide a useful and assembly-friendly steering column.

SUMMARY OF THE INVENTION

This and other objects of the present invention, which will become apparent hereinafter, are achieved by providing a steering column which includes a support element fixedly attachable to a motor vehicle body and having two spaced legs, a steering column jacket located between the two legs of the support element, and a coupling bolt arranged transverse to a steering shaft axis and extending through the steering column jacket and respective longitudinal slots provided in the two legs of the support element. At least one lamella is provided on an outer side of at least one leg of the support element, and at least one lamella is provided on an outer side of the steering column jacket. Both lamellas mutually overlap each other and each has an opening located in an overlapping region of lamellas, the opening of the lamellas defining together a through opening for the coupling bolt. The steering column according to the invention further includes a pressure plate located at one end of the coupling bolt and an adjustable preloading member located at another end of the coupling bolt and cooperating with the pressure plate for pressing the lamellas together. The steering column according to the present invention permits both adjustment of the steering wheel height and the adjustment of a length of the steering shaft.

BRIEF DESCRIPTION OF THE DRAWINGS

Without limiting the scope of the invention, it will now be explained in detail with reference to the drawings showing an embodiment example of the invention. In the drawings:

FIG. 3 is an end view of the steering column shown in FIG. 1 viewed in a direction of arrow A in FIG. 1;

FIG. 4 is an elevational view of a pressure plate abutting a lamella package;

FIG. 5 is a side view of the pressure plate shown in FIG. 4;

FIG. 6 is a plan view of a lamella of a lamella package provided on a steering column jacket;

FIG. 7 is a cross-sectional view of the lamella shown in FIG. 6 along line VII—VII; and FIG. 8 is a plan view of a lamella of a lamella package fixed on a support element.

DETAILED DESCRIPTION OF THE PREFERRED EMBODIMENT

Figure 1:
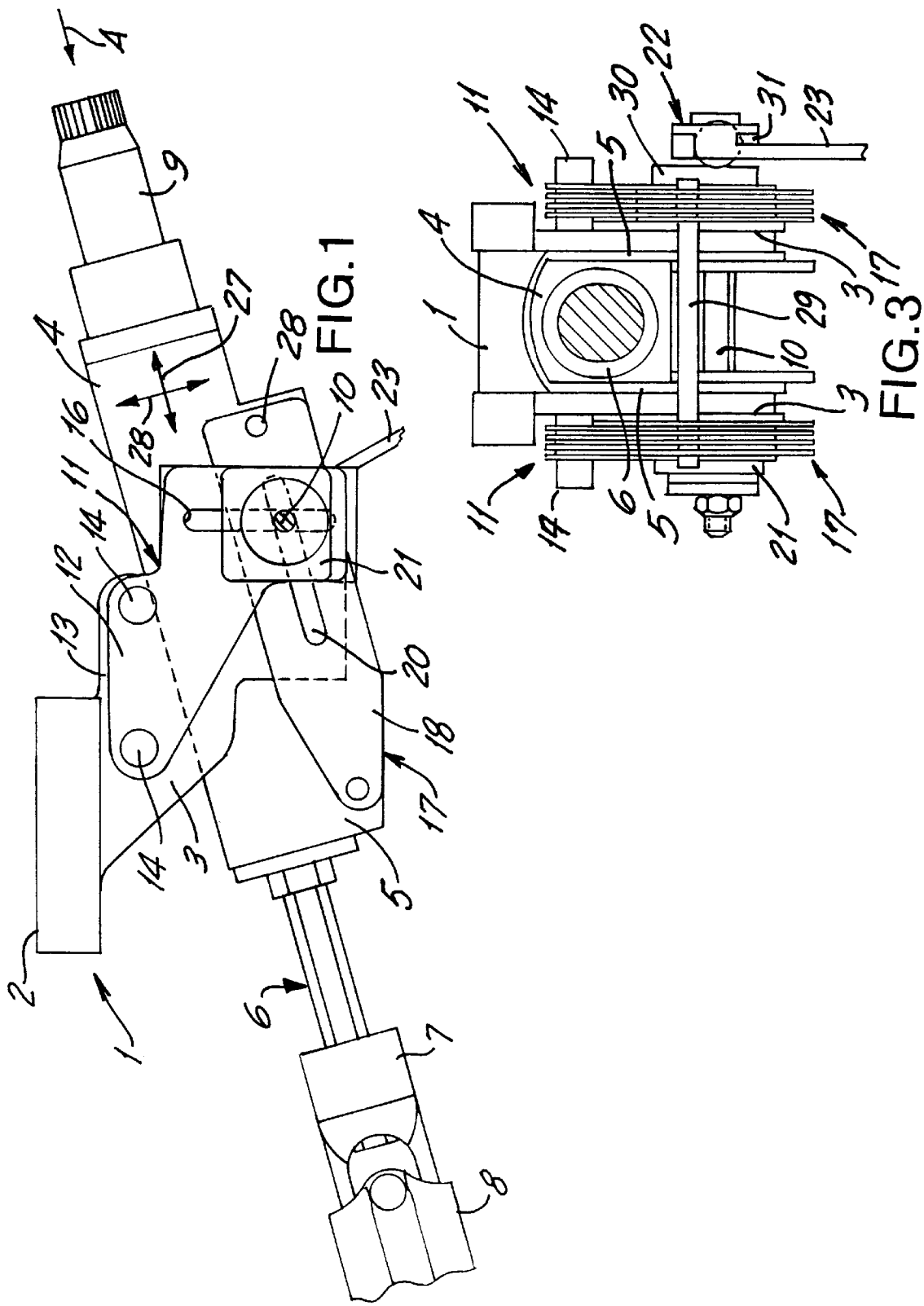
FIG. 1 is a side elevational view of a steering column according to the present invention.
Figure 2:
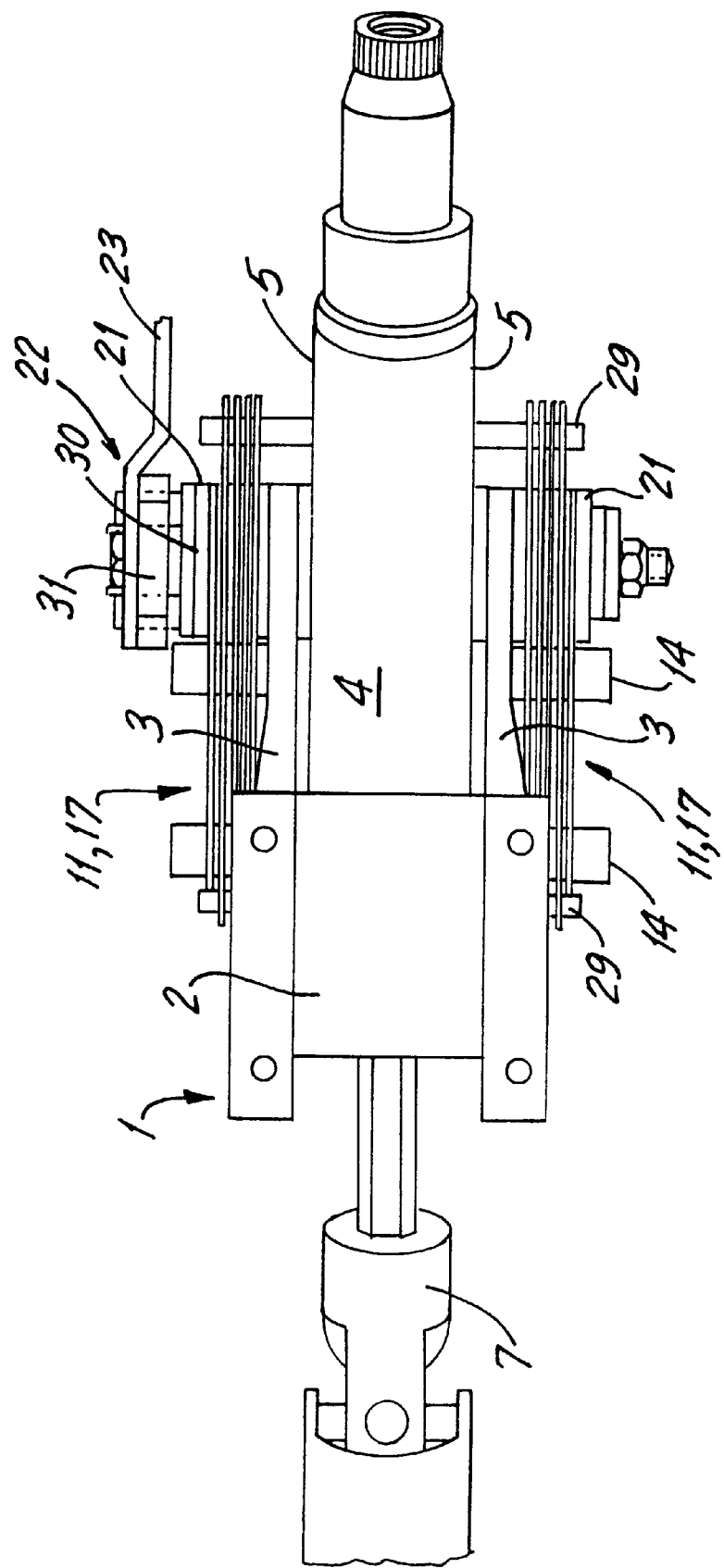
FIG. 2 is a plan view of the steering column shown in FIG. 1.

A steering column shown in FIGS. 1 through 3 includes a U-shape support element or bracket 1 which is secured to a portion of a motor vehicle body (not shown) in such a manner that in case of a accident, it is displaced. This arrangement does not form part of a subject matter of the present invention and will not be considered in detail. The vertical legs 3 of the U-shape support element or bracket 1 extend downwardly. The legs 3 are formed so that in both the plan view (viewed perpendicular to outer surface 2—FIG. 2) and in the end view (FIG. 3), the bracket has a U-shape. Further, the extent of the legs 3 in a direction parallel to the outer surface 2 is greater than the extent in a direction perpendicular to the outer surface 2.

A steering column jacket 4 lies between the two legs 3 of the bracket 1, with its flat lateral flanks extending parallel to each other (FIG. 3). A telescopic steering shaft 6 extends through the steering column jacket 4. The steering shaft is formed of a tubular part and a shank 7 axially displaceable relative to the tubular part. A universal joint 8, which is not shown in detail, connects one end of the shank 7 with the steering gear. The opposite end 9 of the steering shaft 6 carries a steering wheel (not shown).

Paired longitudinal slots are formed in the side flanks 5 of the steering column 4 beneath the steering shaft 6. The slots extend parallel to the longitudinal axis of the steering column jacket 4. They are not seen in the drawings. A coupling bolt 10 extends through these longitudinal slots transverse to the longitudinal axis of the steering column jacket 4. The bolt 10 extends beyond the legs 3 of the support element or bracket 1.

On the outer sides of the vertical legs 3, a plurality of spaced, identically formed, lamellas 12, which form a lamella package 11, are provided. The lamellas 12 are arranged in a cantilever fashion, with only one side 13 thereof being attached to the support element or bracket 1 with retaining bolts 14. The cantilever part 15 of the lamellas 12 has a longitudinal slot 16 (FIG. 8).

The second lamella package 17 is formed of substantially rectangular lamellas 18 and is attached at both its ends 19 to the side flank 5 of the steering column jacket 4. The ends 19 of the rectangular lamellas 18 (FIG. 6) are supported by bolts 29 secured on the steering column jacket 4. Generally, the lamellas 18 are only stringed on the bolts 29, without being effectively connected therewith. The rectangular lamellas 18 have a longitudinal slot 20, and they interspace the lamellas 12 of the above-mentioned lamella package 11 in a sandwich-like manner, with the longitudinal slots 16 and 20 of both lamella packages 11 and 17 crossing each other, limiting the through-opening through which the coupling bolt 10 extends. The sandwich-like manner or arrangement means here an arrangement in which inside of the crossing lamella packages 11 and 17, a lamella of one of the packages is followed by a lamella of another of the packages, as can be seen in FIGS. 2 and 3. For the sake of clarity, the crossing lamellas are shown in both figures somewhat spaced from each other. In an actual embodiment these lamellas abut each other. The lamellas 12 and 18, which form the packages 11 and 17, are formed as flat, smooth metal plates.

In the embodiment shown in the drawings, the crossing lamella packages 11 and 17 are provided on the outer sides of the legs 3, respectively. The length of the coupling bolt 10 is so selected that both its ends projects beyond the packages 11 and 17. At one of ends, there is provide a pressure plate 21 having one of its sides abutting the outermost lamella of the respective lamella package. At the other projected end of the coupling bolt 10, there is provided a preloading element or member 22 having an actuation lever 23. The preloading element 22 may be formed, for example, of two washers 30, 31, through which the coupling bolt 10 extends. The actuation lever 3 pivots one of the washers 30, 31 relative to the other, for example, by 40°÷45°. In one of the washers, roll bodies are provided, while in the other washer there are provided, at least sectionally, helical rolling ramps for the roll bodies. For retaining the actuation lever 23 in a preloaded position, locking or holding members are provided between the two washers 30 and 31. Similar constructions for such preloading elements are, per se, known.

The pressure plate 21 has, at its side adjacent to the lamella package, a central guide bead 24, which cooperates with edges of the slot 16 of the outer lamella 12 of the lamella package 11 and which serves for securing the position or preventing rotation of the pressure plate 21. At its corners, the pressure plate 21 has knob-like bosses 25 which define, together with the lamellas, discrete pressure points. Correspondingly to these knob-like bosses 25 on the pressure plate 21, bead-like strips 26, which extend parallel to edges of respective longitudinal slots, can be formed on the lamella 12 or 18, so that with the preloading element 22 being tightened, the lamellas 12 and 18 of both lamella packages 11 and 17 can abut each other at constructionally defined discrete pressure points. Such a lamella is shown in FIGS. 6 and 7.

During normal operation of a motor vehicle, the preloading element 22 is tightened and, due to its above-described construction, is retained in its position. The coupling bolt 10 presses the lamellas 12 and 18 of both lamella packages 11 and 17 together in a manner of a closed multiple-plate clutch, which insures a predetermined adjusted position of the steering column. When the steering wheel need be adjusted, the vehicle driver actuates the actuation lever 23 to release the preloading element 22. This leads to the "opening" of the "multi-plate" coupling, and the steering column jacket 4 can be displaced longitudinally (in the direction of arrow 27) relative to the stationary support element or bracket 1 in an amount corresponding to the length of the longitudinal slot 20 in the lamella package 17. A longitudinal slot, not shown, the position and size of which correspond to those of the longitudinal slot 20, is provided in side flanks 5 of the steering column jacket 4. The bolt 10 extends through this slot. In addition, it is also possible to pivot the steering column jacket 4, together with the steering shaft extending there through up or down (as shown by arrow 28). The amount of this pivot movement is determined by the length of the vertical slot 16 in the lamella package 11. The pivot center or the pivot axis of this pivot movement is located in the center of the universal joint 8 at the opposite end of the steering shaft 6. When the steering wheel reaches the desired position, the lamellas 12 and 18 of both lamella packages are pressed together with the coupling bolt 10.

The present invention is not limited to the shown number of lamellas in the lamella package. Generally, even providing one lamella package on one side of the support element or the bracket should suffice. For attaching of the ends 19 of the lamellas 18 of the lamella package 17, the bolts 29 are provided, on which the lamellas are stringed. To prevent generation of noise, which can be generated by loose lamellas, the ends 19 of the lamellas 18, which are stringed thereon, can so be formed that they directly abut each other. The lamellas 18, due to their length, have a sufficiently large free spring excursion which enables the preloading with the lamellas 12 of the other lamella package 11. It is further possible to provide the ends 19 of the lamellas 18 with rubber spacers or sleeves.

The coupling bolt 10 can be formed as a yield bolt or be preloaded with a prestressed spring package in order to reduce as much as possible a variation in the clamping force resulting from thermal expansion and association therewith length variations.

In the embodiment, which is shown in the drawings, an adjustment of both the height of the steering wheel and the length of the steering shaft is possible. This is achieved, among others, by providing longitudinal slots 16 and 20 in-the lamella packages 11 and 17 which cross each other. When one of the lamella packages has only longitudinal slots and the other lamella package has a simple throughhole for the coupling bolt, neither the height of the steering wheel nor the length of the steering shaft can be adjusted.

In the longitudinal slots through which the coupling bolt 10 projects, there may be provided plastic inserts which would insure an easy and noiseless insertion of the coupling bolt 10. At a respective end of the longitudinal slots, an impact absorber can be provided.

The above-described, in connection with the lamellas 12 and 18, bead-like losses 26, which define discrete pressure points, can also be provided on the side flanks 5 of the steering column jacket 4 and on associated therewith sides of the legs 32 of the support element or bracket 1. Due to the above-described attachment of the steering column jacket 4 to the support element or bracket 1, no additional support in the region of the universal joint 8 is needed because the coupling bolt 10 provides a sufficiently large clamping force which immovably retains the steering column jacket 4. The pressure plates 21 are advantageously provided on the outer sides of both lamella packages. In the embodiment shown in the drawings, the lamella packages which are formed of a plurality of separate lamellas, are provided on both sides of the legs 3 of the support element or bracket 1. It is conceivable to form a lamella package of a single lamella, so that on both sides of the support element, two crossing lamellas are provided.

What is claimed is:

1. A steering column for a motor vehicle comprising:
a support element fixedly attachable to a motor vehicle body and having two spaced legs;
a steering column jacket located between the two legs of the support element;
a coupling bolt arranged transverse to a steering shaft axis and extending through the steering column jacket and respective longitudinal slots provided in the two legs of the support element;
first lamella package, which is formed of a plurality of spaced first lamellas and which is provided on the outer side of the at least one leg of the support element; and a second lamella package which is formed of a plurality of spaced second lamellas and which is provided on an outer side of the steering column jacket, wherein the first and second packages, respectively, intersect each other in a sandwich-like manner, wherein each of the first lamellas and each of the second lamellas have an opening, wherein the openings of the first lamellas and the second lamellas are located in overlapping regions of the first and second lamellas and define together a through-opening for the coupling bolt;
pressure plate located at one end of the coupling bolt; and
an adjustable preloading member located at another end of the coupling bolt and cooperating with the pressure plate for pressing the first and at least one second lamellas together.

2. A steering column according to claim 1, wherein lamella packages are provided on the outer sides of both legs of the support element.

3. A steering column according to claim 1, wherein the opening of the first and second lamellas are formed as congruent longitudinal slots, respectively, and cross each other.

4. A steering column according to claim 3, wherein sections of the first lamellas of the first package, which include the congruent longitudinal slots, are arranged in a cantilever fashion.

5. A steering column according to claim 4, wherein the first package is secured to the outer side of the at least one leg of the support element.

6. A steering column according to claim 5, comprising at least two retaining bolts for securing the first package to the outer side of the at least one leg of the support element.

7. A steering column according to claim 4, wherein the longitudinal slots in the first lamellas extend substantially vertically.

8. A steering column according to claim 3, wherein the pressure plate has, on a side thereof adjacent to a respective one of the first and second lamellas, knob-like bosses provided along edges of the adjacent side and defining pressure points when the preloading member is tightened.

9. A steering column according to claim 8, wherein ones of the first and second lamellas have bead-like flat strips extending parallel to longitudinal edges of the slots provided therein and are spaced from each other a distance corresponding to a distance between the knob-like bosses provided on the pressure plate.

10. A steering column according to claim 1, wherein the second lamellas are formed as elongate rectangles having both ends thereof attached to the steering column jacket.

11. A steering column according to claim 10, further comprising freely movable string bolts for connecting the ends of the second lamellas to the steering column jacket.

12. A steering column according to claim 1, wherein the first and second lamellas are formed as flat smooth metal plates.

13. A steering column for a motor vehicle comprising:
a support element fixedly attachable to a motor vehicle body and having two spaced legs;
a steering column jacked located between the two legs of the support element;
a coupling bolt arranged transverse to a steering shaft axis and extending through the steering column jacket and respective longitudinal slots provided in the two legs of the support element;
at least one first lamella provided on an outer side of at least one leg of the support element, and at least one second lamella provided on an outer side of the steering column jacket, the at least on first lamella and the at least on second lamella mutually overlapping each other and each having an opening located in an overlapping region of the at least one first and the at least one second lamellas, the opening of the at least one second lamella defining together a through-opening for the coupling bolt;
a pressure plate located at one end of the coupling bolt; and
an adjustable preloading member located at another end of the coupling bolt and cooperating with the pressure plate for pressing the at least one first and at least one second lamellas together,
wherein an opening in the steering column jacket, through which the coupling bolt extends, is formed as an elongate slot substantially congruent with the opening of the second lamella likewise formed as a slot.

14. A steering column for a motor vehicle comprising:
a support element fixedly attachable to a motor vehicle body and having two spaced legs;
a steering column jacket located between the two legs of the support element;
a coupling bolt arranged transverse to a steering shaft axis and extending through the steering column jacket and respective longitudinal slots provided in the two legs of the support element;
at least one first lamella provided on an outer side of at least one leg of the support element, and at least one second lamella provided on an outer side of the steering column jacket, the at least one first lamella and the at least one second lamella mutually overlapping each other ad each having an opening located in an overlapping region of the at least one first and the at least one second lamellas, the opening of the at least one first lamella and the opening of the at least one second lamella defining together a through-opening for the coupling bolt;
a pressure plate located at one end of the coupling bolt; and
an adjustable preloading member located at another end of the coupling bolt and cooperating with the pressure plate for pressing the at least one first and at least one second lamellas together,
wherein the longitudinal slots provided in the legs are congruent with the opening of the at least one first lamella likewise formed as a longitudinal slot.

* * * * *